(12) United States Patent
Ellerbrock et al.

(10) Patent No.: US 7,478,174 B2
(45) Date of Patent: Jan. 13, 2009

(54) SYSTEMS AND METHODS FOR MAINTAINING NETWORK STABILITY

(75) Inventors: Philip J. Ellerbrock, St. Peters, MO (US); Christian J. Noll, Maryland Heights, MO (US)

(73) Assignee: The Boeing Company, Seattle, WA (US)

( * ) Notice: Subject to any disclaimer, the term of this patent is extended or adjusted under 35 U.S.C. 154(b) by 670 days.

(21) Appl. No.: 10/475,375

(22) PCT Filed: Apr. 26, 2002

(86) PCT No.: PCT/US02/13367

§ 371 (c)(1),
(2), (4) Date: Oct. 20, 2003

(87) PCT Pub. No.: WO02/088986

PCT Pub. Date: Nov. 7, 2002

(65) Prior Publication Data

US 2004/0153707 A1    Aug. 5, 2004

(51) Int. Cl.
*G06F 15/16* (2006.01)
(52) U.S. Cl. .................. 709/251; 709/249; 709/253
(58) Field of Classification Search .................. 709/223, 709/251; 714/727, 43, 56
See application file for complete search history.

(56) References Cited

U.S. PATENT DOCUMENTS

| | | | |
|---|---|---|---|
| 4,137,562 A | 1/1979 | Boeck et al. | |
| 4,304,001 A | 12/1981 | Cope | |
| 4,623,884 A * | 11/1986 | Ihara et al. | 370/224 |
| 4,688,168 A | 8/1987 | Gudaitis et al. | |
| 4,825,438 A * | 4/1989 | Bennett et al. | 714/56 |
| 4,942,571 A | 7/1990 | Möller et al. | |

(Continued)

FOREIGN PATENT DOCUMENTS

EP    0 449 458 A1    10/1991

(Continued)

OTHER PUBLICATIONS

Infineon: *C167CR 16-BIT Single-Chip Microcontroller*; Apr. 2000; 72 pages; XP-002201995; Published by Infineon Technologies AG.

(Continued)

*Primary Examiner*—Jeffrey Pwu
*Assistant Examiner*—Shaq Taha
(74) *Attorney, Agent, or Firm*—Alston & Bird LLP

(57) ABSTRACT

The present invention provides systems and methods for maintaining the stability of a network. The present invention includes systems and methods that identify an open circuit condition and reconfigure the network bus to continue communications without slowing the communication rate or removing the network bus from service. The system includes a termination device associated with each network device. Each termination device includes a network termination element that can be switchably connected to the network bus in response to a command issued by a bus controller when an open circuit condition downstream of the network device has been detected. In another embodiment, the present invention provides systems and methods for controlling input current to a remote device located on a network. A sensing element is associated with the device that is capable of sensing the input current and through switches, altering the input current to the remote device.

37 Claims, 9 Drawing Sheets

U.S. PATENT DOCUMENTS

| | | | |
|---|---|---|---|
| 4,969,147 | A | 11/1990 | Markkula, Jr. et al. |
| 4,996,684 | A | 2/1991 | Morley et al. |
| 5,138,709 | A | 8/1992 | Jones et al. |
| 5,223,806 | A | 6/1993 | Curtis et al. |
| 5,251,208 | A | 10/1993 | Canniff et al. |
| 5,274,783 | A | 12/1993 | House et al. |
| 5,295,035 | A * | 3/1994 | Nishijima et al. ............ 361/63 |
| 5,367,678 | A | 11/1994 | Lee et al. |
| 5,437,060 | A | 7/1995 | Delamater et al. |
| 5,445,128 | A | 8/1995 | Letang et al. |
| 5,615,404 | A | 3/1997 | Knoll et al. |
| 5,623,610 | A | 4/1997 | Knoll et al. |
| 5,694,555 | A | 12/1997 | Morriss et al. |
| 5,712,968 | A * | 1/1998 | Nakayama et al. ............ 714/4 |
| 5,737,356 | A | 4/1998 | Harrison et al. |
| 5,742,847 | A | 4/1998 | Knoll et al. |
| 5,778,188 | A * | 7/1998 | Taniguchi et al. ........... 709/236 |
| 5,801,602 | A | 9/1998 | Fawal et al. |
| 5,815,516 | A | 9/1998 | Aaker et al. |
| 5,909,556 | A | 6/1999 | Morriss et al. |
| 5,946,215 | A | 8/1999 | Mito |
| 5,978,875 | A | 11/1999 | Asano et al. |
| 6,013,108 | A | 1/2000 | Karolys et al. |
| 6,065,087 | A * | 5/2000 | Keaveny et al. ............ 710/315 |
| 6,115,713 | A | 9/2000 | Pascucci et al. |
| 6,115,831 | A * | 9/2000 | Hanf et al. .................... 714/43 |
| 6,147,967 | A * | 11/2000 | Ying et al. .................. 370/222 |
| 6,151,560 | A * | 11/2000 | Jones .......................... 702/58 |
| 6,170,025 | B1 * | 1/2001 | Drottar et al. ................. 710/48 |
| 6,195,724 | B1 | 2/2001 | Stracovsky et al. |
| 6,273,771 | B1 | 8/2001 | Buckley et al. |
| 6,275,005 | B1 * | 8/2001 | Stadnick et al. ............ 320/122 |
| 6,397,362 | B1 * | 5/2002 | Ishiyama ..................... 714/724 |
| 6,452,938 | B1 | 9/2002 | Fawal et al. |
| 6,600,972 | B2 | 7/2003 | Morrison et al. |
| 6,891,851 | B1 * | 5/2005 | Demakakos ................. 370/467 |
| 7,073,111 | B2 * | 7/2006 | Whetsel ....................... 714/727 |
| 7,208,955 | B2 * | 4/2007 | Zansky et al. ............... 324/418 |
| 2002/0041601 | A1 * | 4/2002 | Breinlinger ................. 370/420 |
| 2002/0141334 | A1 * | 10/2002 | Deboer et al. ................ 370/227 |

FOREIGN PATENT DOCUMENTS

| | | |
|---|---|---|
| EP | 1069733 A2 * | 1/2001 |
| WO | WO 99/63409 | 12/1999 |

OTHER PUBLICATIONS

Tobias Wenzel; Infineon: *CAN Baudrate Detection with Infineon CAN Devices*; Jul. 1999, 11 pages; XP-002201996.

PCT Notification of Transmittal of the International Search Report, PCT International Search Report for PCT/US02/13190 (filed Apr. 26, 2002).

PCT Notification of Transmittal of the International Search Report, PCT International Search Report for PCT/US02/13246 (filed Apr. 26, 2002).

PCT Notification of Transmittal of the International Search Report, PCT International Search Report for PCT/US02/13303 (Field Apr. 26, 2002).

PCT Notification of Transmittal of the International Search Report; PCT International Search Report for PCT/US02/13366.

PCT Notification of Transmittal of the International Search Report, PCT International Search Report for PCT/US02/13367 (Filed Apr. 26, 2002).

PCT Communication Relating to the Results of the Partial International Search for PCT/US/01/47393.

* cited by examiner

SYSTEMS AND METHODS FOR MAINTAINING NETWORK STABILITY

FIELD OF THE INVENTION

The present invention relates generally to systems and methods for reliably communicating with remote devices via a network bus and, more particularly, to systems and methods for reestablishing the stability of a network that has failed due to an open circuit condition and protecting network devices from excess current.

BACKGROUND OF THE INVENTION

As systems, such as the multimedia entertainment, communications and diagnostic systems utilized by the automotive and aerospace industries, become more complex, a need arises for additional devices to communicate, either with each other or with a central controller or the like. Historically, these systems included dedicated wiring extending between the various devices in order to support communications therebetween. As systems have become more integrated and the communications requirements have been increased, the amount of dedicated wiring that would be required can quickly become excessively large, both in terms of the space required for the wiring and the cost of the wiring and the attendant installation. Moreover, as the amount of dedicated wiring increases, the overall complexity of the system also generally increased as well as the likelihood that some portion of the wiring might be damaged or broken during or following installation.

As such, network buses have been developed to provide a common communication path between a plurality of devices. In automotive and aerospace applications, for example, a network bus can be utilized to monitor various components and to collect diagnostic and status information. In this regard, diagnostic and status information relating to the strain, acceleration, pressure and/or temperature to which the various components are subjected may be collected and analyzed. By way of further example, a network bus architecture is currently being developed to support communications and the delivery of multimedia information to the occupants of a vehicle, such as an automobile, minivan, sports utility vehicle, aircraft, boat or the like. Advantageously, this network bus would transport the audio signals, including streaming audio signals, produced by one or more of a radio, a cassette tape player, a compact disc player or the like to selected speakers or headphone jacks throughout the vehicle. Similarly, the network bus may support voice and data communications with a cellular telephone carried by an occupant of the vehicle, as well as communications with a laptop computer, a handheld computing device or the like. Also, the network bus may transmit video signals, including streaming video signals, from a television receiver, a videocassette recorder or other video source to one or more video monitors. In addition, the network bus may transmit sensor and actuator signals to and from devices such as drivetrain devices, passive restraint devices, crash avoidance devices, drive-by-wire devices, or the like.

In addition to the variety of devices that are connected to a network bus, one or more controllers are also generally connected to the network bus for receiving data from the various devices and for sending commands to the devices. Among other things, these commands specify the manner in which the various devices are to function including the manner in which the various devices are to transmit information over the network bus. Additionally, the controller(s) can receive input from an operator, such as an occupant of the vehicle. This input can include, for example, an indication of the source(s) of the signals to be transmitted over the network bus as well as the destination of the signals.

Traditionally, networks of the type described above have transmitted data in analog format. Unfortunately, analog signals are susceptible to noise introduced into the signals during data transmission. Given that many of the transmitted signals have a low amplitude to start with, this noise can corrupt the signal and decrease the signal to noise ratio to levels that cause loss of resolution in the signal. Further, as many of these network devices are scattered some distance from the controller, the electrical lines connecting the network devices to the controller may be sufficiently long to cause signal degradation due to DC resistance in the wiring.

In light of these shortcomings, it would be advantageous to utilize digital networks. But, many conventional digital networks suffer from a variety of problems themselves. For example, many existing digital networks operate according to complicated protocols which require each network device to have a relatively high level processor, thereby increasing the cost of the network devices. Complicated protocols also introduce overhead into the messages on the bus that are not necessary for data acquisition and control. This overhead can severely limit the number of data samples that can be transmitted on the bus. These networks also have other problems. For example, some do not support both acquisition and control. Further, these networks typically have bulky network device interfaces, slow network communication rates and/or a low network device count. Additionally, many computer systems that include digital networks do not operate in a time-deterministic manner. As such, these computer systems generally lack the capability to schedule a trigger command to the network components that repeats or is interpreted and executed with any precision timing.

Regardless of the digital or analog nature of network, the network bus may be damaged during or following installation. In this regard, the network bus typically consists of a plurality of conductors or wires that may extend great lengths between the various controllers and network devices. Due to accidents or other unforeseen circumstances, one or more of the wires may be broken, thereby creating an open circuit. Thus, components on one side of the open circuit will be unable to communicate via the broken conductor with components on the other side of the open circuit. Additionally, signals transmitted over the broken conductor will be reflected by the broken end of the conductor due to the impedance mismatch. The reflected signals will then be returned along the conductor, thereby interfering, both constructively and destructively, with other signals being transmitted via the conductor. While the components on one side of the open circuit may be able to communicate at relatively low communication rates, such as ten kilobits per second, reflected signals will generally prevent effective communications between the components at higher communication rates such as ten megabits per second or the like. Moreover, the open circuit will render the broken conductor more susceptible to noise, thereby further limiting effective communications.

In instances in which one or more conductors of the network bus are broken, one of two different approaches has generally been taken. According to one approach, the network bus remains unrepaired for at least some period of time rendering the network bus useless until repairs are made. The network may utilize a redundant bus, which, after the damaged network bus is retired, carries the communications for the network until the damaged network bus is repaired. In addition, communications can continue over the network bus, albeit at a relatively slow communication rate that is selected so as not to be corrupted by the reflected signals. Since a number of applications require that communications be conducted via the network bus at relatively high communication rates, the intentional slowing of the data over the network bus to reduce, if not negate, the deleterious impact of reflected signals may be inappropriate. Alternatively, communications via the network bus can be halted and the technician can troubleshoot the network bus to identify the break in the network bus and can then physically repair the broken conductors. Once the repairs have been completed, the communications over the network bus can be recommenced. However, the physical repair of the network bus oftentimes requires that the network bus be removed from service for some period of time, which action may also be inappropriate for certain applications, such as time-sensitive applications, safety-critical applications, applications that result in some type of liability if inoperable, or other applications that demand continuous monitoring or feedback.

Accordingly, it would be advantageous to develop an improved network bus that could accommodate bus failure caused by an open circuit condition, such as the breaking of one or more conductors of the network bus. Moreover, it would be desirable for the improved network bus to support continued communications between the devices connected to the network bus after the open circuit condition, without having to remove the network bus from service in order to physically repair the network bus.

In addition to problems with open circuits in a network, there may also be problems associated with provision of excessive current to a device on the network. To protect the often complex and costly remote devices of many networks, a circuit breaker or fuse is connected at a distribution area to a power supply that supplies input current to the remote devices, such as via the network bus. Typically, circuit breakers and fuses interrupt the current in an electric circuit, sometimes referred to as tripping the circuit breaker or fuse, when the current through the circuit becomes higher than that allowed by the circuit breaker or fuse. Conventional circuit breakers and fuses are typically rated for a specific current level that generally depends upon the components in the circuit and their current tolerances. When the current through the circuit breaker exceeds the rated current level, the circuit breaker or fuse trips and interrupts the current in the circuit.

In one type of conventional circuit breaker, such as a mechanical circuit breaker, when enough current runs through the circuit to trip the circuit breaker, a pair of contacts that are normally in contact in order to conduct current through the circuit breaker and the rest of the circuit are separated, such as by preloaded springs, thus breaking the circuit. Generally, a conventional fuse includes a strip of a low-melting metal that is connected in series with the circuit. Because of its electrical resistance, the metal strip is heated by current through the circuit. And if the current exceeds the current rating of the fuse, the strip melts, thus breaking the circuit.

While conventional circuit breakers and fuses are used in many power systems, they pose some problems. Generally, conventional circuit breakers and fuses are positioned at the distribution point between the power source and the network bus to protect the network bus and all of the devices as a whole instead of the devices individually. But because different remote devices can have different current tolerances, a single conventional circuit breaker or fuse cannot optimally protect all of the remote devices of the network from excessive current.

Occasionally in networks employing a single conventional circuit breaker or fuse the remote devices can draw an excessive amount current that is over the current tolerance of the respective remote devices, such as during defective operation of one or more remote devices. In such an instance, it would be desirable for the circuit breaker or fuse to break the circuit to protect the remote devices drawing the excessive amount of current. But in some instances the excessive amount of current is below the current rating of the circuit breaker or fuse and, therefore, the circuit breaker or fuse provides no protection for the remote devices drawing the excessive amount of current. In such an instance, the affected remote devices suffer from an unnecessary danger of damage caused by overheating and even fire due to the excessive amount of current. Conversely, if the current rating of the circuit breaker or fuse is set according to the remote device with the lowest current tolerance, the circuit breaker or fuse will trip if remote devices having higher current tolerances attempt to draw current levels within their tolerance but below the lowest current tolerance. As shown, a single circuit breaker or fuse connected to the network bus at a distribution point is undesirable because remote devices typically have different current tolerances. Because a single circuit breaker or fuse results in all-or-nothing power to the remote devices on the network since, if one remote device requires protection from excessive current, all of the devices on the network must receive the same protection, even if it is unnecessary.

In addition to the inability of a single conventional circuit breaker or fuse to optimally protect all of the remote devices of the network from excessive current, conventional mechanical circuit breakers and fuses suffer from limitations due to their material characteristics. Most conventional circuit breakers and fuses cannot be adjusted for different requirements without replacing the entire circuit breaker. For example, if a mechanical circuit breaker is rated for a ten amp trip and is attached to a circuit containing a remote device rated for five amps, the ten amp rated circuit breaker would need to be replaced with a five amp rated circuit breaker to provide over-current protection for the five amp rated remote device.

One method by which to protect all of the remote devices from individual excessive current situations is to provide an individually current rated circuit breaker or fuse to each remote device connected to the network bus, in addition to the circuit breaker or fuse connected at the distribution point to protect the network bus. But disadvantageously, such a method leads to an increase in the cost, size and weight of the network because it requires added components (i.e., circuit breakers). Additionally, because such a method merely employs multiple conventional circuit breakers, it suffers from the same material drawbacks as conventional circuit breakers and fuses in that it does not allow for adjustments to account for changes in the characteristics of the remote device, such as replacing the remote device with one current rating with a remote device with a different current rating.

Accordingly, it would be advantageous to develop an improved system to control the input current to the remote devices to protect remote devices on an individualized basis based upon the respective current tolerances of each remote device without adding additional circuit breakers to the network. Moreover, it would be desirable for the improved system to allow for adjustments in the current rating protection afforded to the remote devices to account for changes in the current tolerance of the remote device.

SUMMARY OF INVENTION

In light of the above mentioned problems with reliability in network systems, the present invention provides systems and method that address problems with open circuits in the network system and also systems and methods for limiting the current supplied to network devices. These various systems and methods are discussed below.

Specifically, the present invention provides a system and method for reestablishing network stability. According to this aspect of the present invention, the system and method can identify bus failure due to an open circuit condition and can automatically reconfigure the network bus to continue to support communications without permanently slowing the communication rate and without having to remove the network bus from service in order to physically repair the network bus. As such, the system and method of the present invention support continued high speed data communications over the network bus even in the event of a bus failure due to an open circuit condition.

According to one embodiment, the system includes a bus controller disposed in electrical communication with the network bus. The system also includes a plurality of network devices disposed in electrical communication with the network bus and the bus controller. The controller is adapted to detect a bus failure due to an open circuit condition, such as by detecting loss of communication with at least one of the network devices. To terminate the ends of the network bus, the system can also include at least one end termination element. The system further includes at least one and, more typically, a plurality of termination devices associated with respective network devices. Each termination device can include a network termination element, such as a resistor selected to match the characteristic impedance of the network bus, that can be switchably connected to the network bus in response to a command issued by the bus controller once the bus controller has detected a bus failure due to an open circuit condition downstream of the network device. In one advantageous embodiment, the system includes a plurality of network device interfaces connected to the network bus and to respective network devices. In this embodiment, the network device interface preferably includes the termination device. In addition, the network bus generally includes a pair of conductors such that the termination device is preferably adapted to switchably connect the network termination element, such as the resistor, across the pair of conductors.

The bus failure will occur at some location along the network bus. As such, the bus controller is preferably adapted to inventory the network devices that remain in electrical communication therewith. The bus controller is also preferably adapted to identify the network device that is located closest to the location of the open circuit. Thus, the bus controller of this embodiment can issue a command that instructs the termination device associated with the network device that is located closest to the location of the open circuit to switchably connect the network termination element to the network bus. Thus, the controller and each of the network devices connected to the network bus at a location between the controller and the network termination element can continue to communicate without ever having to remove the network bus from service. Advantageously, this communication can also continue at the same relatively high communication rates as prior to the bus failure since the network termination element will prevent reflections.

To further protect the network bus, at least one and, more typically, each of the termination devices also includes a switch in-line with the network bus. In this embodiment, the bus controller is also adapted to issue commands instructing the termination device that has switchably connected the network termination element to the network bus to also open the switch that is in-line with the network bus to eliminate any network bus stub extending beyond the network device. By eliminating any network bus stub, communications conducted via the network bus are further protected from noise.

According to another aspect of the present invention, the system includes first and second bus controllers disposed in electrical communication with the network bus at opposite ends thereof such that the network bus extends between the first and second bus controllers. Once a bus failure due to an open circuit condition is detected, each bus controller is adapted to issue a command to instruct the termination device associated with a respective network device to switchably connect a network termination element to the network bus. In this regard, the open circuit will occur at a location along the network bus that separates the network bus into first and second portions. As a result of the configuration of this embodiment of the system, the first-and second bus controllers will be in electrical communication with the first and second portions of the network bus, respectively.

In order to appropriately connect the network termination element to the network bus, each bus controller is preferably adapted to inventory the network devices that are disposed in electrical communication with the respective portion of the network bus and to identify the network device that is located closest to the location of the open circuit. As such, each bus controller can instruct the termination device associated with the network device that is located closest to the location of the open circuit and that is in electrical communication with the respective portion of the network bus to switchably connect the network termination element to the respective portion of the network bus. At least some of the termination devices can also include a switch in-line with the network bus. As such, each bus controller can also issue a command instructing the respective termination device that has switchably connected its network termination element to the respective portion of the network bus to open the switch that is in-line with the network bus, thereby eliminating any network bus stub extending beyond the respective network device. According to this embodiment, each termination device can include the network termination element and a pair of switches in-line with the network bus and disposed on opposite sides of the network termination element. As such, the command issued by each bus controller instructing the respective termination device to open the switch that is in-line with the network bus will preferably cause the switch that is positioned downstream of the network termination element to be opened. Thus, each bus controller can continue to communicate with each of the network devices connected to the respective portion of the network bus at the high communication rate intended.

According to another aspect of the present invention, a method for reestablishing network stability is provided. According to this aspect, the bus failure due to an open circuit condition at a location along the network bus which separates the network bus into first and second portions is initially detected. Thereafter, at least one network device disposed in electrical communication with the first portion of the network bus is identified. More typically, the network devices that are disposed in electrical communication with the first portion of the network bus are inventoried and the network device that is disposed in electrical communication with the first portion of the network bus that is located closest to the open circuit is identified. Thereafter, a command is issued over at least the first portion of the network bus to instruct a termination device associated with one of the network devices that were identified to be in electrical communication with the first portion of the network bus to connect its network termination element to the network bus, thereby reestablishing the stability of the network. In instances in which the network device that is disposed in electrical communication with the first portion of the network bus that is located closest to the open circuit has been identified, the command that is issued over the first portion of the network bus preferably instructs the termination device associated with the network device that is located closest to the open circuit to connect its network termination element to the network bus. Thus, communications can continue to be conducted via the first portion of the network bus at the highest communication rate intended without the interference created by reflections.

In one embodiment, the network devices that are disposed in electrical communication with the second portion of the network bus are also inventoried and the network device that is disposed in electrical communication with the second portion of the network bus that is located closest to the open circuit is also identified. In this embodiment, a command can also be issued over the second portion of the network bus to instruct the termination device associated with the network device that is disposed in electrical communication with the second portion of the network bus that is located closest to the open circuit to also connect its network termination element to the network bus. Thus, communications can also continue to be conducted via the second portion of the network bus at the highest communication rate intended without the interference created by reflections.

In order to reduce the susceptibility of the broken network bus to noise, another command can be issued over the first portion and, in some embodiments, the second portion of the network bus to instruct the termination device(s) that have connected a network termination element to the network bus to disconnect any portion of the network bus that extends beyond the network device toward the open circuit.

The present invention therefore provides a system and method that permit a bus failure due to an open circuit condition to be identified and the network bus to be automatically reconfigured such that the stability of the network will be maintained. As such, communications can continue over the network bus at a high communication rate without concern for undesirable reflections or other noise caused by the open circuit. Moreover, the system and method of the present invention permit continued communications over the network bus without having to immediately remove the network bus from service in order to physically repair the network bus. Thus, communications can continue and the network bus can be scheduled for repair at some more convenient time, such as during some period of time in which the network bus would otherwise have been idle.

In addition to sensing open circuits in a network, the present invention also provide a system and method for controlling the input current to remote devices communicating via a common bus. According to the present invention, the system and method can control input current to a plurality of remote devices to protect the remote devices on an individualized basis without utilizing conventional circuit breakers or fuses. Additionally, the system and method of the present invention can adjust the current protection afforded to the remote devices without changing an entire circuit breaker or fuse.

According to one embodiment of the present invention, the system for controlling input current to a plurality of remote devices includes a network, such as a digital network. The network has a network controller for directing communications, such as digital communications, with the remote devices. Electrically connected between the network controller and the remote devices, is a network bus. The system also includes a plurality of sensing elements electrically connected between the network bus and respective remote devices. Each sensing element is capable of sensing the input current to the respective remote device so that a measure of the input current can be provided to the network controller. Additionally, the system includes a plurality of switches electrically connected between the network bus and respective remote devices. Each switch is capable of controllably altering the input current to the respective remote device. For example, the switches can operate in either an on mode where the switches permit respective remote devices to receive input current, or an off mode where the switches prevent the respective remote devices from receiving input current.

In order to protect the remote devices from excessive current, the network controller is capable of controlling each switch based upon the input current sensed by the respective sensing element and further based upon a current tolerance, or input current rating, of the respective remote device. For example, the network controller can control each switch such that the input current does not exceed the input current rating of the respective remote device for more than a second predefined period of time. In embodiments where the switches operate in at least one of the on mode and the off mode the network controller controls the switches by controlling the mode of the switches. In this regard, the network controller can operate a switch in the on mode when the input current does not exceed the input current rating of the respective remote device for more than the second predefined period of time, and place the switch in the off mode when the input current exceeds the input current rating of the respective remote device for more than the second predefined period of time. In another embodiment, the network controller is further capable of transmitting a warning signal, such as to a user interface, when the level of the respective input current exceeds the input current rating of the respective remote device for more than a first predefined period of time, where the first predefined period of time is less than the second predefined period of time.

In one advantageous embodiment, the network further comprises a plurality of network device interface elements electrically connected between the network bus and respective remote devices. In this embodiment, the sensing elements are electrically connected to respective network device interface elements, and the network controller is capable of controlling each network device interface element to thereby control each switch of the plurality of switches.

In operation, the sensing elements first sense the input current to each respective remote device. Then, a signal indicative of each respective input current is transmitted, such as by the network device interface element, across the network bus. The network controller receives the signal and thereafter controls the input current to each remote device, such as by placing the remote device in the on and/or off modes via the respective switch. In embodiments including the network device interface elements, the network controller controls each network device interface to thereby control the input current to the respective remote device. To control the input current, the network controller first determines a current control based upon the input current and further based upon the input current rating of the respective remote device, and thereafter transmits a return signal indicative of the current control to each respective remote device. For example, the network controller can determine the current control by determining whether the input current to each respective remote device exceeds the input current rating of the respective remote device for more than the second predefined period of time, and thereafter transmit the return signal accordingly. In a further embodiment, the network controller can additionally transmit the warning signal if the input current to a respective remote device exceeds the input current rating for more than the first predefined period of time, which is less than the second period of time.

The system and method of the present invention therefore protect the remote devices on an individualized basis from excessive current that may damage the remote devices without utilizing conventional circuit breakers or fuses. Also, by utilizing a network controller to control the input current to the remote devices, the present invention can adjust the control of the input current to account for in-rushes of current that exist for less than a time period that could damage the remote devices.

BRIEF DESCRIPTION OF THE DRAWINGS

Figure 1:
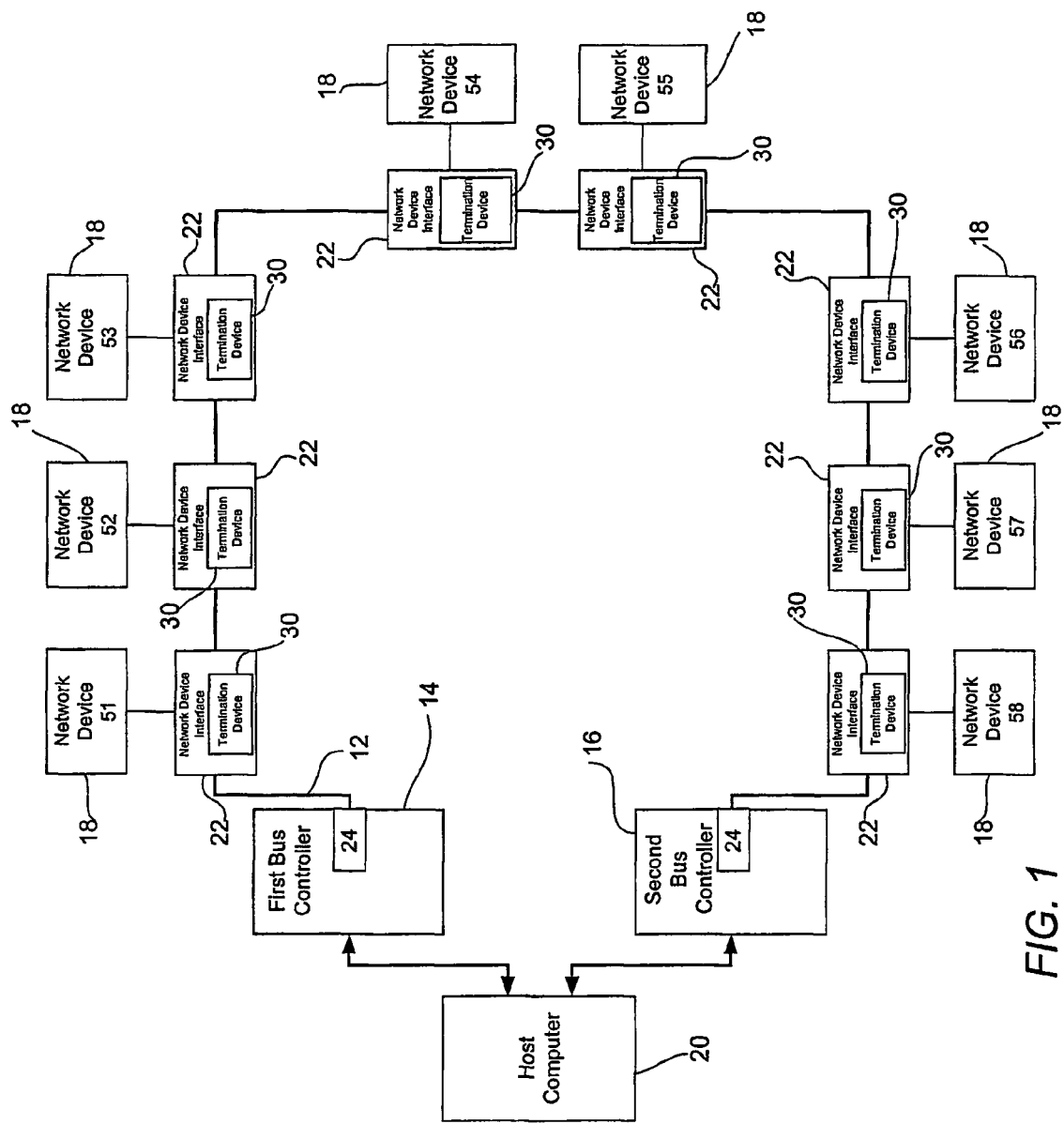
Figure 2:
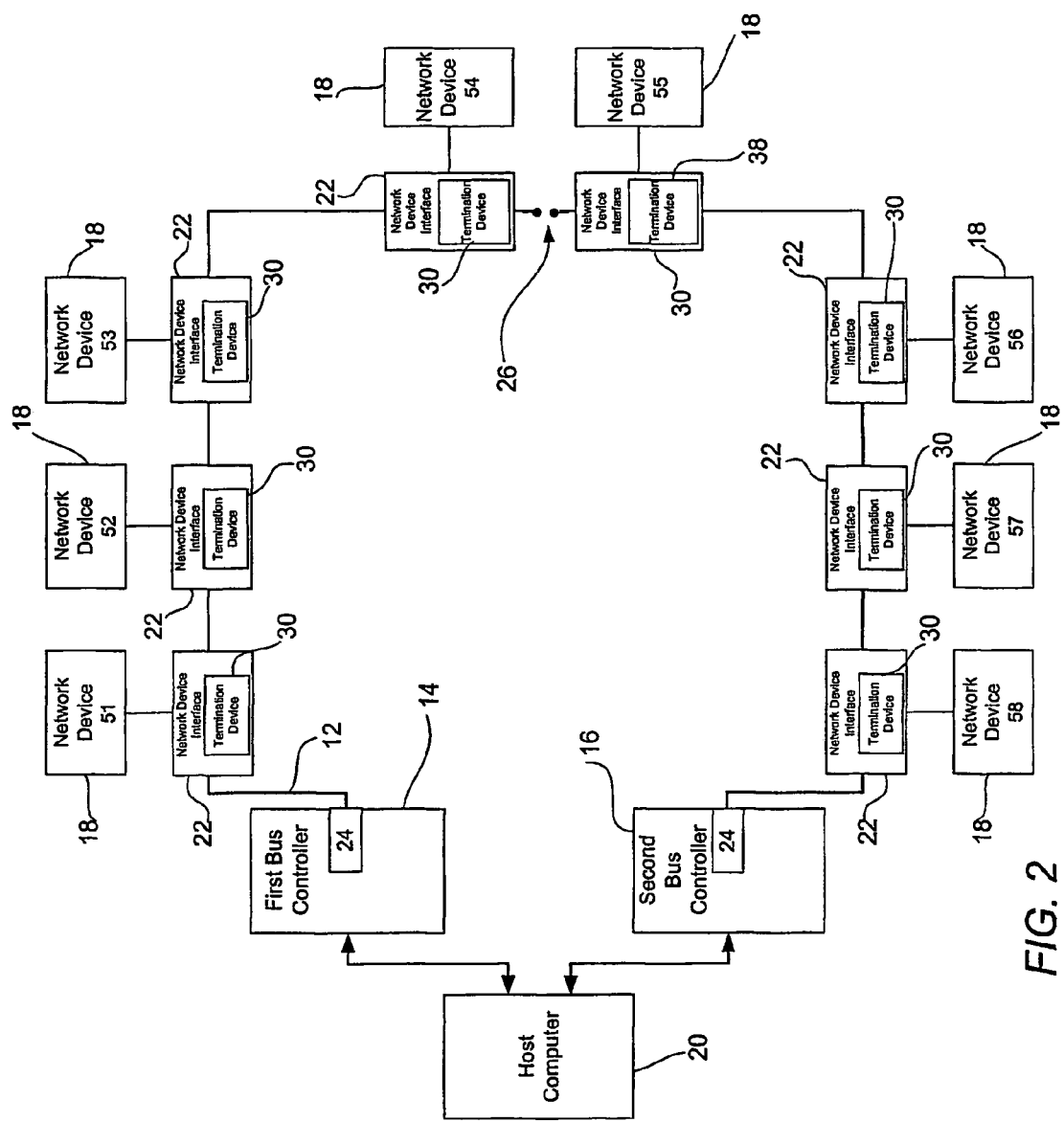
Figure 3:
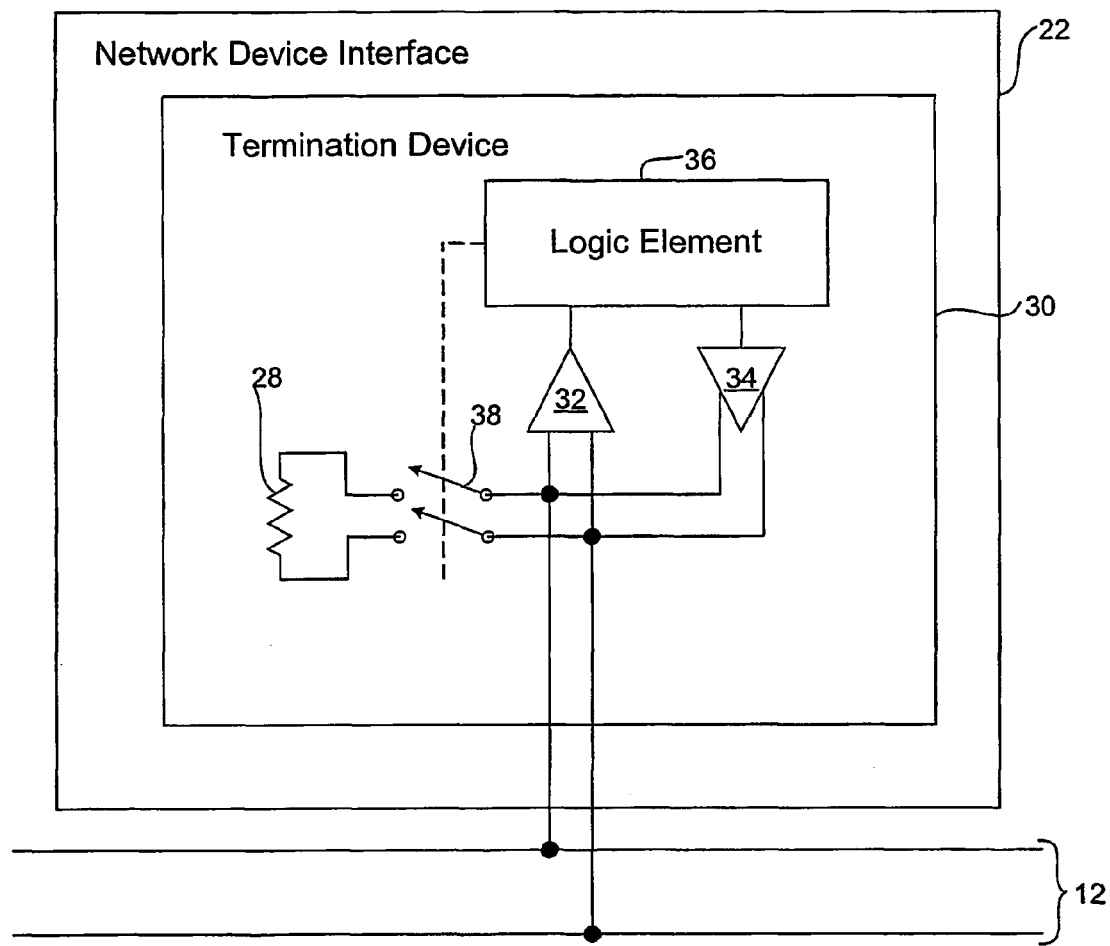
Figure 4:
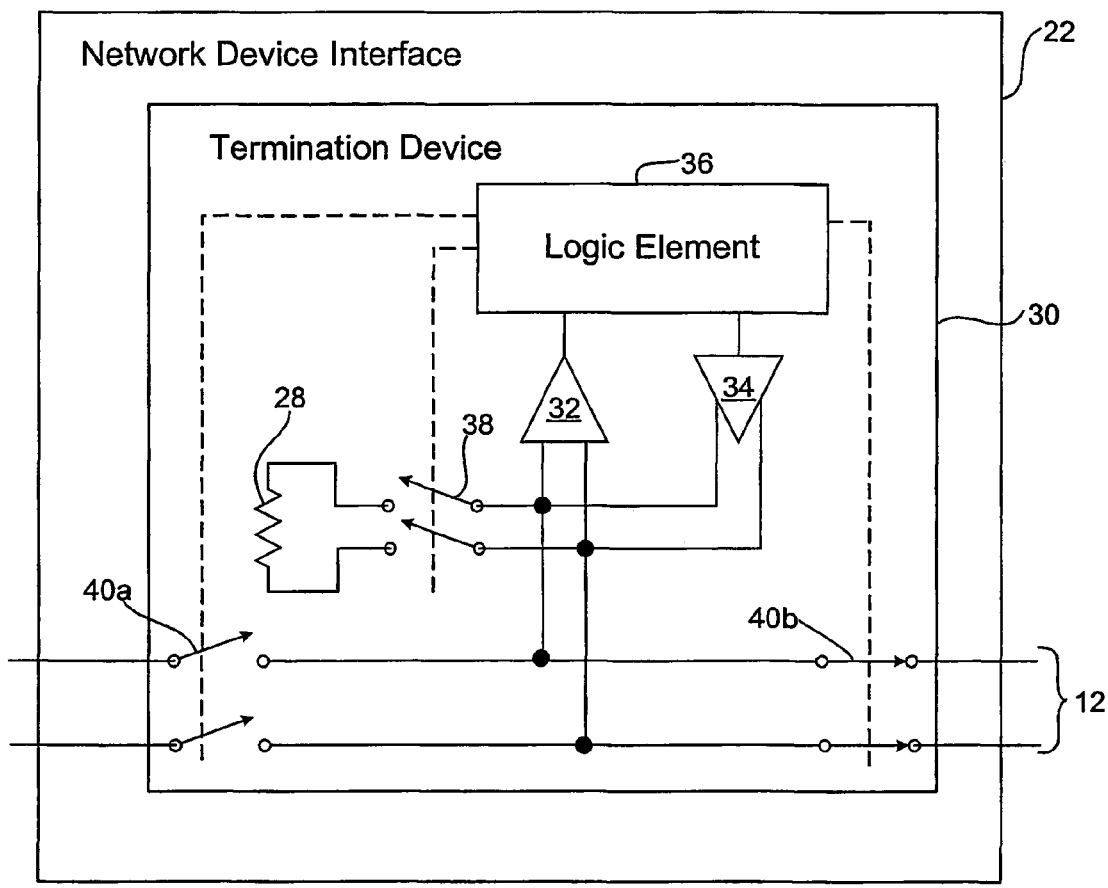
Figure 5:
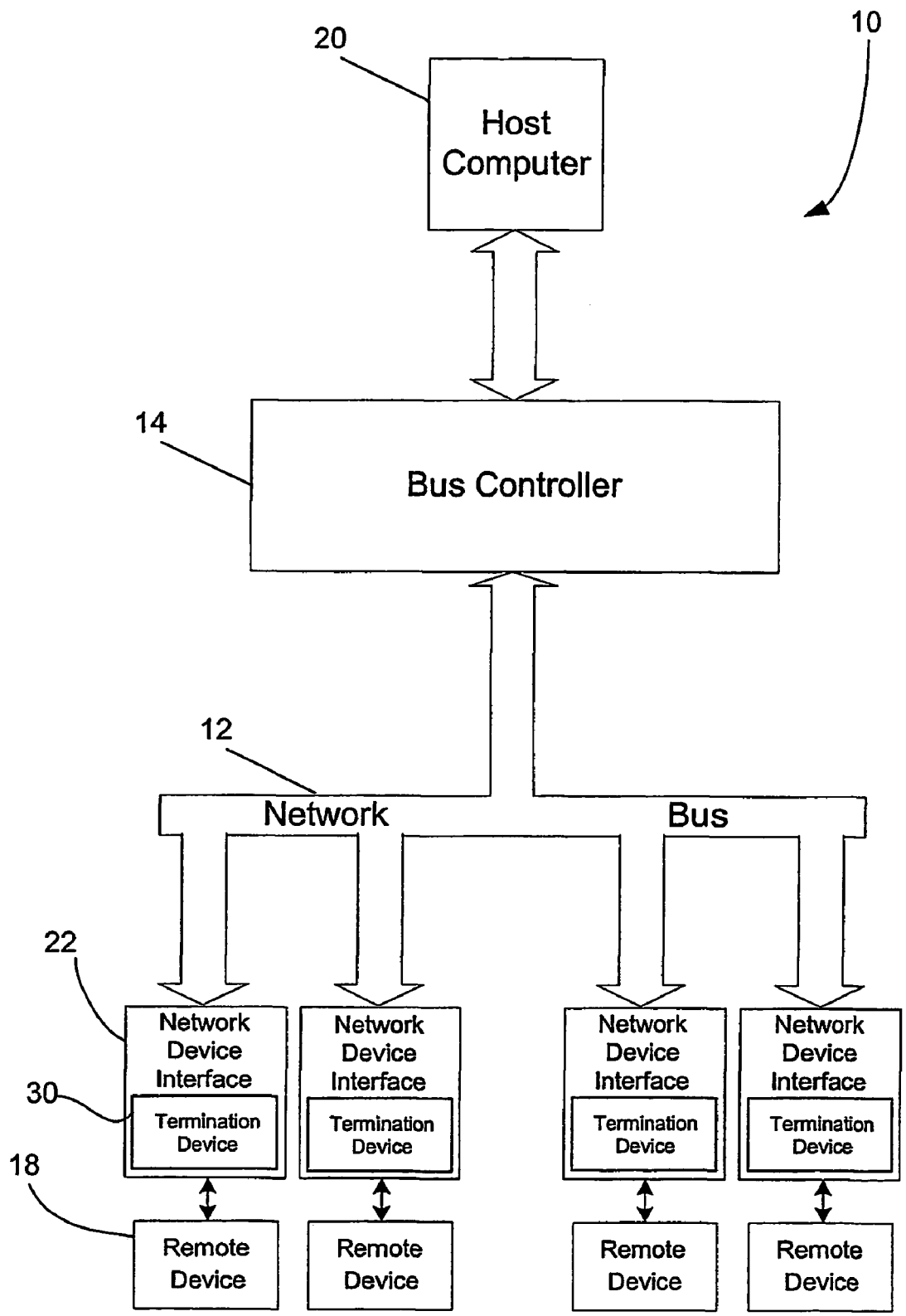

Having thus described the invention in general terms, reference will now be made to the accompanying drawings, which are not necessarily drawn to scale, and wherein:

FIG. 1 is a schematic representation of a system according to one embodiment of the present invention that includes a pair of bus controllers connected to opposite ends of a network bus;

FIG. 2 is a schematic representation of the system of FIG. 1 following a break in the network bus;

FIG. 3 is a schematic representation of a termination device according to one embodiment of the present invention;

FIG. 4 is a schematic representation of a termination device according to another embodiment of the present invention; and FIG. 5 is a schematic representation of a system according to another embodiment of the present invention that includes a single bus controller.

Figure 6:
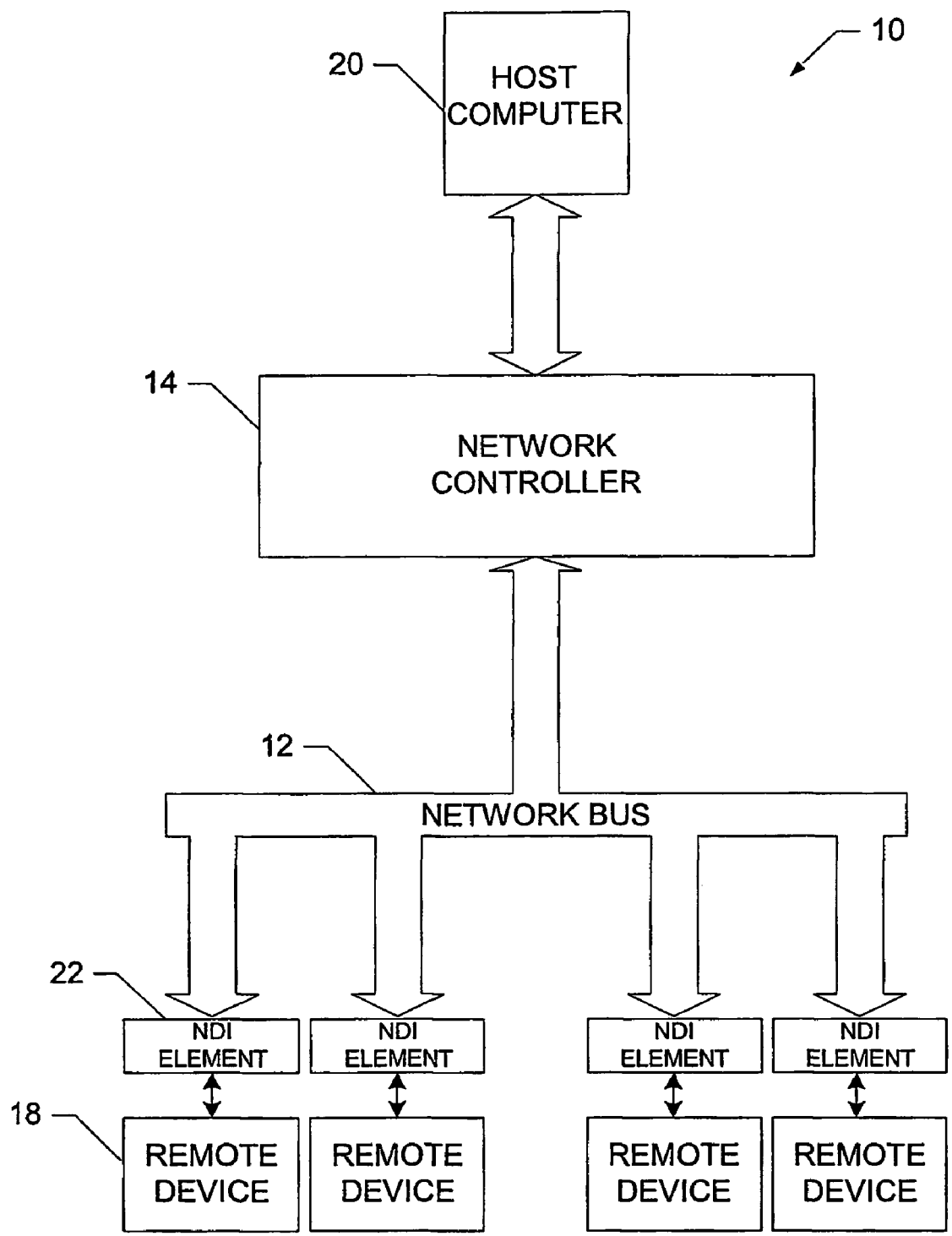
Figure 7:
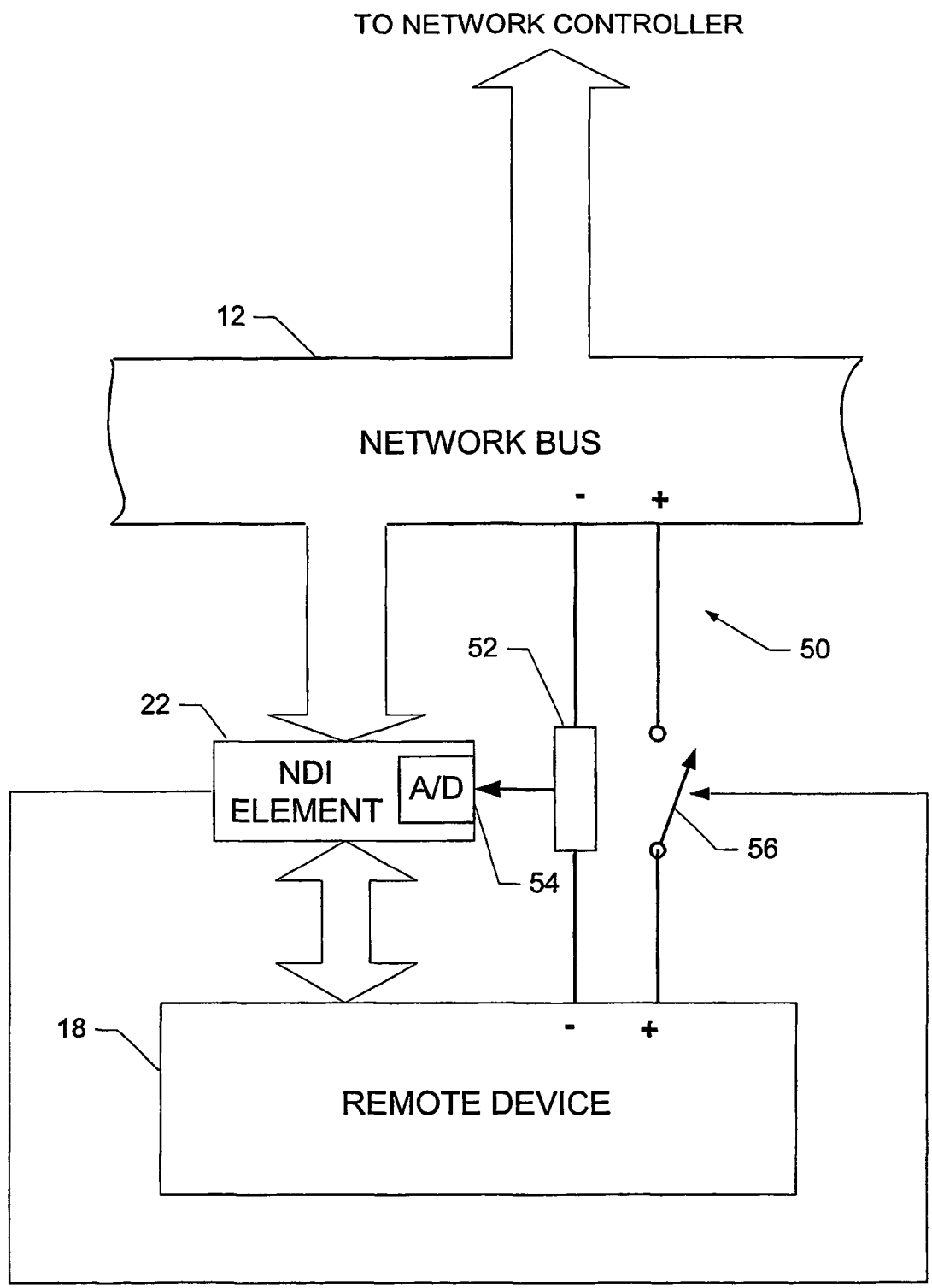
Figure 8:
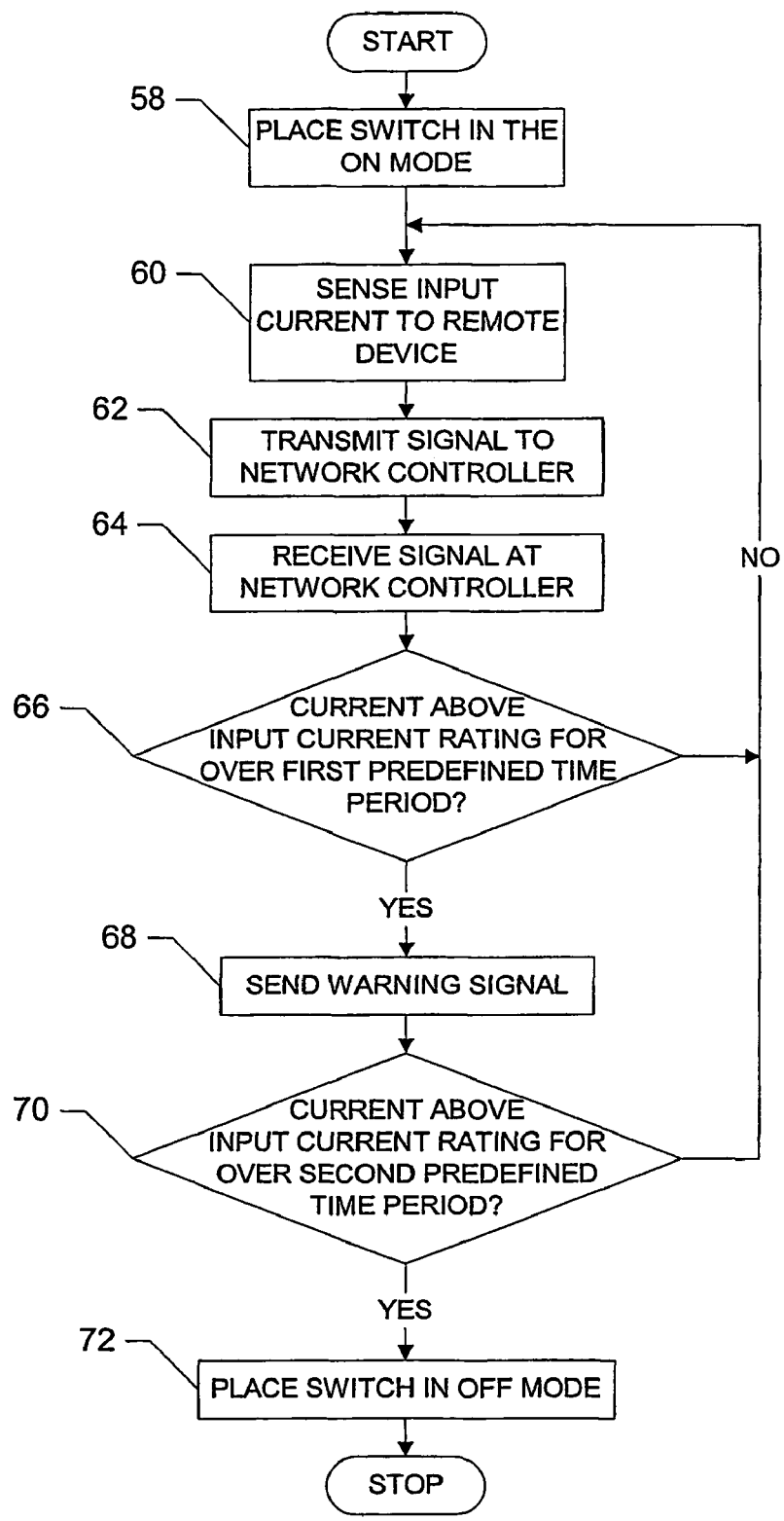
Figure 9:
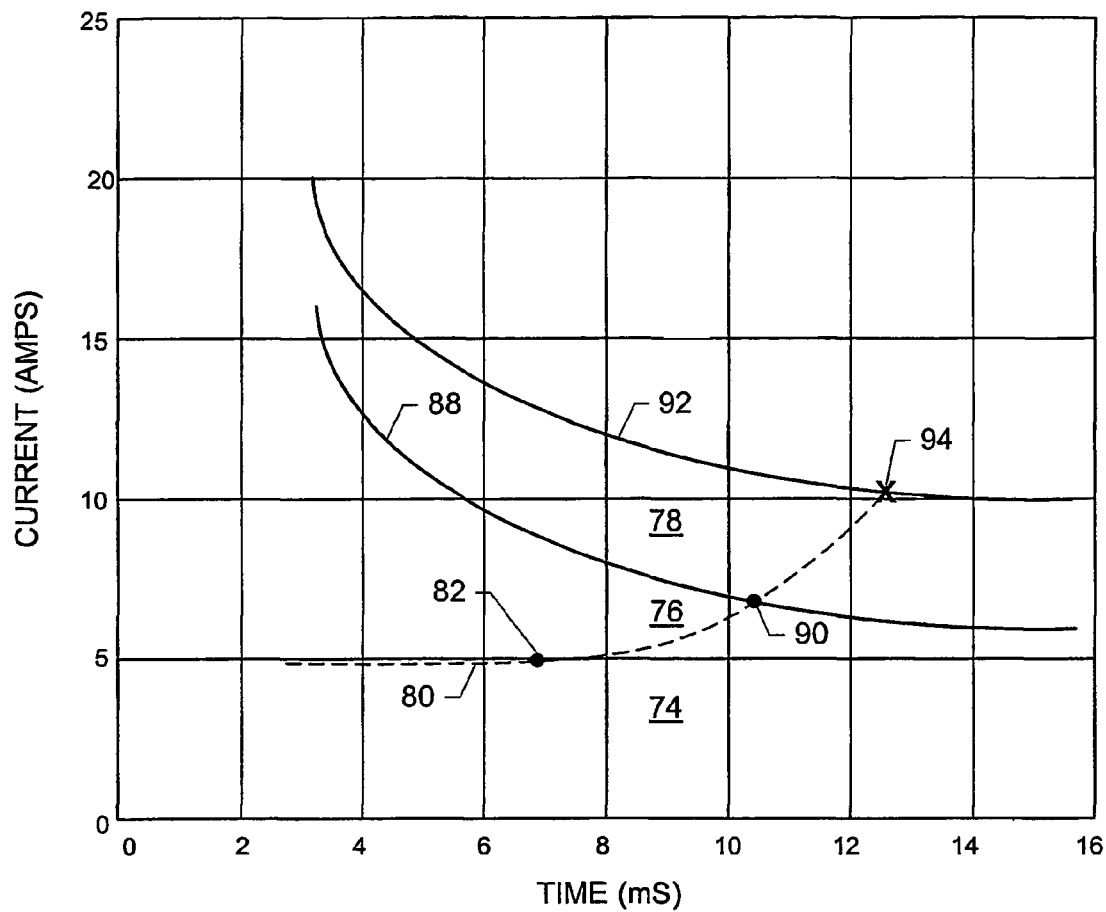

FIG. 6 is a schematic block diagram illustrating a network system that would benefit from the excessive current protection afforded by one embodiment of the present invention;

FIG. 7 is an exploded schematic block diagram illustrating various elements of the system for controlling the input current to a plurality of remote devices, according to one embodiment of the present invention;

FIG. 8 is a flow chart illustrating the method of controlling the input current to a plurality of remote devices according to one embodiment of the present invention; and FIG. 9 is a graph illustrating a characteristic trip curve and a warning curve for a respective load and the input current to the respective load.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be described more fully below, the present invention provides systems and method for sensing an open circuit in a network and reconfiguring the network such that communications can continue despite the open circuit. In addition, the present invention also provides systems and methods that control the amount of current supplied to individual devices in a network, such that the device do not experience current overload. It must be understood that these systems and methods may be used individually in a network system or in conjunction with one another to provide network stability. Each of these aspects of the present invention are discussed in turn below.

Referring now to FIG. 1, a system 10 that benefits from the open circuit protection aspects afforded by the present invention is depicted. While several embodiments of the system are illustrated and will be hereinafter described for purposes of example, other types of systems can readily employ the open circuit protection afforded by the present invention. Moreover, the system and method of the present invention will be primarily described in conjunction with automotive and aerospace applications, such as automotive and aerospace applications designed to support communications and the delivery of multimedia information to the occupants of a vehicle and/or to monitor various components and to collect diagnostic and status information. However, the system and method of the present invention can be utilized in conjunction with a variety of other applications, both in the automotive and aerospace industries and outside of those industries. For example, the system and method can be utilized in industrial automation and ground testing applications.

As shown in FIG. 1, the system 10 of one embodiment includes a network bus 12 that extends between a pair of bus controllers. Thus, a first bus controller 14 is electrically connected to a first end of the network bus, while a second bus controller 16 is electrically connected to the second end of the network bus. In the illustrated embodiment, the first and second bus controllers are co-located such that the network bus forms a loop between the pair of bus controllers. As will be apparent, the bus controllers can be located at different positions from one another such that the network bus is no longer looped, if so desired. The system depicted in FIG. 1 also includes a plurality of network devices 18 electrically connected to the network bus and, in turn, to the bus controllers, at different points along the network bus. Thus, the network bus supports communications between the bus controllers and the network devices, as well as communications between the network devices themselves.

The bus controllers 14, 16 are designed to issue commands to respective network devices 18 and, in at least some instances, to receive data from the network devices. For example, the commands may dictate that a network device provide a particular type of data, such as status or other diagnostic data. Alternatively, the commands issued by the bus controllers can direct one or more of the network devices to provide signals of a predetermined type, such as audio signals, video signals or the like, and for one or more of the other network devices to receive the signals. Although various types of bus controllers can be utilized, one advantageous type of bus controller is the network controller described by U.S. patent application Ser. No. 09/736,878 entitled Network Controller for Digitally Controlling Network devices Via a Common Bus, filed Dec. 14, 2000, the contents of which are incorporated herein by reference. As described in U.S. patent application Se. No. 09/736,878 and as illustrated in FIG. 1, the bus controllers may also be disposed in electrical communication with a host computer 20 that generally directs the operation of the bus controllers and that analyzes data received by the bus controllers from the network devices.

During ordinary operation of the system 10 depicted in FIG. 1, the first bus controller 14 typically serves as a master controller and is responsible for issuing commands over the network bus 12. In contrast, the second bus controller 16 is generally a slave controller that monitors the network bus so as to detect the various commands issued by the first bus controller and the responses provided by the network devices 18. The second bus controller is preferably capable of issuing commands and the second bus controller may actually be required to assume control of a portion of the network bus in the event of a bus failure, as described hereinbelow.

Various types of network buses 12 can be employed. Typically, the network bus consists of one, two, three or more pairs of wire, such as differential twisted pair copper wires, for transmitting commands, data and other signals. As such, the network bus can be designed to support either a standard half duplex configuration via one pair of wires or a full duplex configuration via two pairs of wires. In some embodiments designed for synchronous operation, one of the pair of wires can be utilized to transmit a clock signal typically from a bus controller to the network devices 18. Still further, the network bus can include a pair of wires for supplying power and a common ground to the network devices.

The system 10 can include a wide variety of network devices 18; most, if not all, of which are located remote from the bus controllers. For example, the network devices can include sensors for providing data, such as status or diagnostic data, to the bus controllers and, in turn, to the host computer 20 so that the health and/or operation of the network device can be monitored. In an automotive application, for example, the network devices can include sensors for monitoring the throttle position, the oil pressure, the water temperature, the transmission fluid pressure, the seat position, the antilock brake system, the suspension, the passive restraint system and the steering system, to name but a few. In order to provide feedback to the operator, the network devices can also include one or more displays, such as the dashboard displays in a vehicle, for displaying the status or diagnostic data, either directly or after appropriate processing. Alternatively, the network devices may include an actuator for performing a particular function in response to a command from the bus controller. In the automotive application, for example, the network devices can include actuators for controlling the throttle position, the anti-lock brake system, the suspension, the passive restraint system and the active suspension system, to name but a few. Still further, the network devices may include an audio or video source. In this regard, the network devices can include radio receivers, tape cassette players, compact disc players, cellular telephone receivers or other audio sources for providing control signals and audio signals, including, in some instances, streaming audio signals, to the network bus. Correspondingly, the network devices can include speakers, headphone jacks or the like for receiving audio signals from the network bus and for providing a corresponding audible output. Similarly, network devices can include a television receiver, a video cassette player or other video source for providing video signals, including streaming video signals, to the network bus. Accordingly, network devices can include a video monitor or the like for receiving the video signals and for displaying images based upon the video signals. In addition, the network bus may transmit sensor and actuator signals to and from devices such as drivetrain devices, passive restraint devices, crash avoidance devices, drive-by-wire devices, or the like.

While the network devices 18 may be directly connected to the network bus 12, the network devices of one advantageous embodiment are associated with respective network device interfaces 22 as described by U.S. patent application Ser. No. 09/735,146 entitled Network Device Interface for Digitally Interfacing Data Channels to a Controller Via a Network, filed Dec. 12, 2000, the contents of which are incorporated herein in their entirety. In this advantageous embodiment, the network device interface is disposed in electrical communication with the network bus for transmitting signals to the network bus and for receiving signals from the network bus. Each network device interface is also in communication with one or more network devices via respective data channels. While each network device interface is shown to be connected to a single network device in FIG. 1, a network device interface could be connected to two or more network devices, if so desired. As described by U.S. patent application Ser. No. 09/735,146, a network device interface performs various functions to facilitate communications by the network device over the network bus. For example, a network device interface may store the data collected by the associated network device (s) such that the stored data may be provided to the bus controllers 14, 16 via the network bus upon request. If the network device is an analog device, the network device interface may also convert signals between the digital format supported by the network bus and the analog format supported by the network device.

In operation, the first bus controller 14 issues various commands and respective network devices 18 respond based upon the commands. The bus controllers and the network devices can communicate according to any of a number of different protocols. As described in U.S. patent application Ser. No. 09/736,878, for example, the bus controllers and the network devices can communicate according to a Manchester-encoded bi-phase sensor and system (BiSenSys) protocol. Alternatively, the bus controllers and the network devices can communicate according to a protocol compatible with a universal asynchronous receiver transmitter (UART) physical layer. Preferably, however, the protocol is selected to minimize the overhead and to correspondingly maximize the communication capability. Further, the protocol is preferably selected to be relatively simple such that neither the network devices nor the network device interfaces 22 will require a high level processor. Instead, the bus controllers and the associated host computer 20 can include the majority of the processing power and the network device interfaces can include logic that is readily implemented in hardware, software or firmware. The communications supported by the system 10 may also be either synchronous or asynchronous and may involve the transmission of various types of messages. As described by U.S. patent application Ser. No. 09/36,878, for example, one advantageous communications technique is based upon the transmission of message frames that include command frames and data frames having respective predetermined lengths or sizes. Depending upon the protocol, the system can also support various command sets. As with the protocol, the command set is preferably selected to minimize the overhead that must be transmitted via the network bus and to be relatively simple. One example of a suitable command set is described by U.S. patent application Ser. No. 09/735, 146.

Regardless of the protocol implemented by the system 10, the first bus controller 14 issues commands via the network bus 12 and thereafter awaits a response from the network devices 18. By way of example, the following table illustrates a command designated Trigger issued by the first bus controller that polls specific network devices for data that has been collected by the network devices. As illustrated, the initial trigger command polls the network devices designated S1, S2 and S5, while a subsequent trigger command polls the network devices designated S1, S3, S4, S6, S7 and S8. As indicated, the network devices can be polled at different intervals, as demonstrated by the more frequent polling of the network device designated S1.

| First Bus Controller | Second Bus Controller |
| --- | --- |
| Trigger | |
| Poll S1 | |
| Poll S2 | |
| Poll S5 | |
| Trigger | |
| Poll S1 | |
| Poll S3 | |
| Poll S4 | |
| Poll S6 | |
| Poll S7 | |
| Poll S8 | |

In order to prevent undesirable reflections of the signals transmitted via the network bus 12, the opposed ends of the network bus are preferably properly terminated. In this regard, the ends of the network bus are preferably terminated by an end termination element 24 having an impedance that matches the characteristic impedance of the network bus. In the illustrated embodiment, for example, an end termination element is associated with each bus controller 14, 16 in order to properly terminate the respective end of the network bus. In one embodiment in which the network bus consists of several pairs of wires, a respective end termination element is placed across each pair of wires at each of the opposed ends of the network bus. The characteristic impedance of the network bus is typically resistive, such that the end termination element is also typically a resistor. By way of example, the network bus generally has a characteristic impedance of about 100-120 ohms, with a Category 5 Ethernet bus having a characteristic impedance of 100 ohms. As such, each resistor placed across a pair of wires preferably has the same resistance in order to appropriately terminate the network bus and prevent undesirable reflections.

Upon initialization of the system 10, the first bus controller 14 inventories the network devices 18 connected to the network bus 12 and assigns a unique logical address to each network device so that the bus controllers can communicate with a specific network device or a specific group of network devices. A wide variety of techniques can be utilized to inventory the network devices connected to the network bus and to assign unique logical addresses to the network devices. One advantageous technique for inventorying the network devices and assigning unique logical addresses is the bit competition technique described by U.S. patent application Ser. No. 09/735,146 as well as U.S. Provisional Patent Application No. 60/286,793 entitled Systems, Methods and Bus Controllers for Assigning an Address to a Network Device Added to an Existing Network, filed Apr. 26, 2001, and PCT Patent Application No. PCT/US02/13366 entitled Systems, Methods and Bus Controllers for Assigning an Address to a Network Device Added to an Existing Network, Apr. 26, 2002, the contents of which are also incorporated herein in their entirety.

Moreover, the bus controllers 14, 16 are preferably provided with information regarding the relative position of each network device 18 along the network bus 12. Typically, this information is provided to the bus controllers during the initial configuration of the system 10 by a system designer or the like. While the information can be provided to the bus controllers in a variety of manners, a file containing the information is typically loaded into a memory device associated with each bus controller or with the host computer 20. Upon initialization, the first bus controller can therefore confirm which network devices are actually connected to the network bus and, based upon the prestored information, can then determine the order in which the network devices are connected to the network bus.

Additionally, or alternatively, according to one embodiment, the host computer 20 can determine the information regarding the relative position of each network device 18 by utilizing in-line switches 40a, 40 b included within the termination device 30, as discussed below and illustrated in FIG. 4. To determine the information, the host computer chooses a network device and, through the first bus controller 14, commands the termination device associated with the chosen network device to place a network termination element 28 across the broken pair of conductors and open one pair of in-line switches 40a or 40b.

By opening one pair in-line switches 40a or 40b, the network bus 12 will be separated into two first and second portions 12a, 12b that are electrically connected to the first and second bus controllers 14, 16, respectively. One portion of the network bus will be properly terminated by the network termination element 28, but the other portion will not be properly terminated. By issuing commands via the first portion of the network bus, and thereafter receiving responses, the first bus controller 14 can determine which network devices 18 are connected to the first portion of the network bus. If the first bus controller receives no response, then the host computer 20 instructs the second bus controller to determine which network devices are connected to the second portion of the network bus.

Once the network devices 22 on the first or second portion 12a, 12b have been determined, the first bus controller 14 can command the termination device 30 associated with the chosen network device to remove the network termination element 28 from across the broken pair of conductors and close the in-line switches 40a and 40b. The host computer 20 and bus controllers 14,16 can then repeat the process, beginning with the host computer choosing another network device 18. By completing the process with virtually all of the network devices, the host computer can determine a matrix of locations for each network device without having any previous knowledge of the respective positions of the network devices.

Prior to, during or following installation, the network bus 12 may be broken, as shown in FIG. 2. A broken network bus creates an open circuit condition 26 that can cause bus failure. Once broken, the broken ends of the network bus are not properly terminated and will cause undesirable reflections of the signals transmitted via the network bus. In addition, the open circuit condition separates the network bus into first and second portions 12a, 12b that are electrically connected to the first and second bus controllers 14, 16, respectively. The first bus controller can continue to communicate with the first portion of the bus, with such communication being limited by the deleterious effect of the reflections. Similarly, the second bus controller can continue to communicate via the second portion of the network bus, with such communications also being limited by the deleterious effect of the reflections.

Once a network bus 12 develops an open circuit condition 26, the first bus controller 14 will detect the open circuit due to a loss in communication with some or all of the network devices 18 connected to the bus. With respect to the exemplary embodiment depicted in FIG. 2, the first bus controller would detect an open circuit condition once attempts to communicate with any of the network devices designated S5-S8 fail.

Upon detecting an open circuit condition 26 on the network bus 12, the first bus controller 14 initially slows the communication rate to a much lower rate which will not be adversely affected by the reflections. By way of example, a network bus may typically support communications at a communication rate of ten megabits per second. However, upon the detection of an open circuit condition, the first bus controller may slow the communication rate to one megabit per second, or between ten and twenty kilobits per second. As will be apparent, the concept of relatively high and low communication rates is dependent upon the physical layer as well as a number of other factors. As such, the foregoing communication rates are merely provided by way of example and not of limitation of relatively high and low communication rates. By significantly slowing the communication rate, the resulting reflections are relatively short relative to the data being transmitted at the slower rate. Thus, the reflections will not significantly impair the communications over the network bus.

In addition to slowing the communication rate, the second bus controller 16 is promoted to be a master controller that is capable of transmitting commands over the network bus 12, albeit the second portion 12b of the network bus. Thus, the first controller 14 will communicate at the slower baud rate with the network devices 18 connected to the first portion 12a of the network bus and the second bus controller will communicate with the network devices connected to the second portion of the network bus, also at the slower baud rate.

The bus controllers 14, 16, either themselves or under the control of the host computer 20, can determine the location of the open circuit 26. In order to determine the location of the open circuit, the first bus controller inventories the network devices 18 connected to the first portion 12a of the network bus 12, and the second bus controller inventories the network devices connected to the second portion 12b of the network bus. While various techniques for inventorying the network devices can be employed, one advantageous technique for inventorying the network devices connected to a network bus is the bit competition technique described by U.S. patent application Ser. No. 09/735,146 as well as the aforementioned U.S. Provisional Patent Application No. 60/286,793, and PCT patent application No. PCT/US02/13366 entitled Systems, Methods and Bus Controllers for Assigning an Address to a Network Device Added to an Existing Network, filed Apr. 26, 2002. This advantageous bit competition uses the UUID associated with each device. As each device will have a unique UUID, the bus controller can determine which devices are in the network.

Based upon the results of the network device inventory and the stored information relating to the relative position of each network device 18 along the network bus 12, the first bus controller 14 can identify the network device that is connected to the first portion 12a of the network bus and that is located closest to the open circuit 26. Similarly, the second bus controller 16 can identify the network device that is connected to the second portion 12b of the network bus and the network device of the second portion that is located closest to the open circuit.

At least some and, more typically, each network device 18 is associated with a network termination element 28 that can be switchably connected to the network bus 12. As shown in FIG. 3, for example, a network termination element is typically one component of a termination device 30 that is associated with a respective network device. The termination device may be integral to the network device. However, in embodiments of the present invention in which a network device interface 22 is associated with each network device, the network device interface preferably includes the termination device.

The termination device 30 can be configured in various manners, but in the illustrated embodiment, the termination device includes a receiver 32 and a transmitter 34 for receiving signals from the network bus 12 and for transmitting signals to the network bus, respectively. The termination device also includes a logical element 36 for recognizing a command issued by a bus controller to switchably connect the network termination element 28 across a respective pair of conductors of the network bus. Like the logic or the control circuitry of the network device interface 22, the logical element can be embodied in a number of different manners, including in software or firmware. In one advantageous embodiment, however, the control circuitry of the network device interface including the logical element of the termination device is embodied by an application specific integrated circuit (ASIC).

As shown in FIG. 3, the termination device 30 also includes a pair of normally open switches 38 on opposite sides of the network termination element 28. Regardless of its implementation, in response to a command by the respective bus controller, the logical element 36 will direct the switches to be closed, thereby placing the network termination element across the respective pair of conductors. As described above, the network termination element preferably has an impedance that matches the characteristic impedance of the network bus 12. Since the characteristic impedance of the network bus is typically resistive, the network termination element is also typically a resistor. While the network termination element is typically placed across a respective pair of conductors as shown in FIG. 3, the network termination element may be an active network termination element as known to those skilled in the art, if so desired.

While the termination device 30 depicted in FIG. 3 includes a single network termination element 28 for being switchably connected across a respective pair of conductors, the termination device preferably includes the same number network termination elements as the number of pairs of conductors that comprise the network bus 12. By way of example, in embodiments in which the network bus has three pairs of conductors, the termination device can include three separate network termination elements, i.e., resistors, that can be separately switchably connected across respective pairs of conductors. As such, if the first bus controller 12a has determined that the network bus was completely severed and all three pairs of conductors are broken, the respective bus controller will command the termination device associated with the network device 18 located closest to the open circuit 26 to switchably connect a resistor across each of the three pairs of conductors. However, if only one of the three pairs of conductors of the network bus of this exemplary embodiment are broken, the bus controllers will determine which pair of conductors is broken and will command the termination device associated with the network device located closest to the open circuit to place a network termination element, e.g., a resistor, across the pair of conductors that was broken, without placing resistors across the other two pairs of conductors that remain intact.

Once the network termination elements 28 are placed across the broken pairs of conductors, the bus controllers increase the communication rate at which communications are conducted over the first and second portions 12a, 12b of the network bus 12. For example, the bus controllers can increase the communication rate up to the relatively high communication rate, such as ten megabits per second that was supported prior to the network bus being broken. As a result of the termination of the first and second portions of the network bus proximate the open circuit 26, the first bus controller 14 can reliably communicate with the network devices 18 connected to the first portion of the network bus without undesirable reflections, while the second bus controller 16 can reliably communicate with the network devices connected to the second portion of the network-bus without undesirable reflections. As such, both the first and second controllers must now issue commands over the respective portions of the network bus and must monitor the resulting responses provided by the network devices. In this regard, in order to poll the network devices in the same sequence as set forth above in Table 1, the first and second bus controllers can now each issue a command to the respective portion of the network bus as set forth in the following table.

| First Bus Controller | Second Bus Controller |
|---|---|
| Trigger | Trigger |
| Poll S1 | Poll S5 |
| Poll S2 | |
| Trigger | Trigger |
| Poll S1 | Poll S6 |
| Poll S3 | Poll S7 |
| Poll S4 | Poll S8 |

As shown in Table 2, each bus controller issues a trigger command over the respective portion of the network bus 12. In response to the initial trigger command from the first bus controller 14, the network devices designated S1 and S2 are polled for stored data, while in response to the initial trigger command from the second bus controller 16, the network device designated S5 is polled for stored data. In response to the second trigger command from the first bus controller, the network devices designated S1, S3 and S4 are polled for stored data, while in response to the second trigger command from the second bus controller, the network devices designated S6-S8 are polled for stored data. Thus, the system 10 remains fully functional even though the network bus has been broken.

Depending upon the location of the open circuit 26 relative to the network termination elements 28, a network bus stub may extend beyond each network termination element to the location of the open circuit. As the communication rate at which communications are conducted via the first and second portions 12a, 12b of the network bus is increased and/or as the overall length of the network bus 12 increases, the network bus stubs may introduce additional reflections and/or render the network bus more susceptible to noise. As such, the termination device 30 of one embodiment can also include switches 40a and 40b in-line with each conductor of the network bus, for switchably disconnecting any network bus stub. As shown in FIG. 4, the in-line switches are typically closed during a normal operation of the network bus. When an open circuit condition is detected, however, each bus controller preferably commands the termination device associated with the network device 18 connected to the respective portion of the network bus and located closest to the open circuit not only to place the network termination element across the broken pair of conductors, but also to open one pair of switches in-line with each broken conductor. By opening these switches, the stub of the network bus that extends downstream from the network device toward the open circuit is electrically disconnected from the respective portion of the network bus. Thus, the undesirable reflections or noise that would be introduced via the stub of the network bus are prevented. As described in conjunction with the network termination element, a switch can be included in-line with each conductor of the network bus. As such, if more than one pair of conductors of the network bus is broken, the switch associated with each broken conductor can be opened.

While a system 10 employing a network bus 12 that extends between a pair of bus controllers 14, 16 has been illustrated and described, the system and method of the present invention are suitable for a wide variety of other network bus architectures. For example, the system can include a network bus having a single bus controller connected to the network bus, either at one end of the network bus or at any point along the network bus as depicted in FIG. 5. In this embodiment, any break in the network bus would effectively prevent the bus controller from further communicating with the network devices 18 that are connected to the portion of the network bus on the opposite or distant side of the open circuit from the bus controller. However, the bus controller could still communicate with the network devices connected to the same portion of the network bus to which the bus controller is connected.

In order to continue to communicate with these network devices 18 at a relative high communication rate, however, the bus controller 14 would again inventory the network devices connected to the remaining portion of the network bus and identify the network device connected to the remaining portion of the network bus and located closest to the open circuit. As described above, the network device preferably has an associated termination device. As such, the bus controller commands the termination device associated with the network device connected to the remaining portion of the network bus and located closest to the open circuit to place the network termination element across the broken pair of conductors. In addition, the termination device can include switches 40 in-line with the network bus. As such, the bus controller can also command the termination device associated with the network device connected to the remaining portion of the network bus and located closest to the open circuit to also open the in-line switches in order to disconnect the stub of the network bus that may extend beyond the network device. As such, the bus controller can continue to communicate with the network devices connected to the remaining portion of the network bus at a relatively high communication rate without suffering from reflections or other noise introduced via the open circuit.

In addition to providing systems and methods for sensing open circuits in a network, the present invention also provides systems and methods that also provide current protection for devices connected to the network. FIG. 6 illustrates a network system 10 similar to the system of FIG. 5 that would benefit from the excessive current protection afforded by the present invention is depicted. While several embodiments of the system are illustrated and will be hereinafter described for purposes of example, other types of systems can readily employ the excessive current protection afforded by the present invention.

As shown in FIG. 6, the system 10 includes a network bus 12 electrically connected to a network controller 14. Whereas, the system illustrated only includes a single network controller, as shown in FIG. 5, it should be understood that more than one network controller 16 can be utilized, such as for fault tolerance purposes, without departing from the spirit and scope of the present invention. The system depicted in FIG. 6 also includes a plurality of remote devices 18 electrically connected to the network bus and, in turn, to the network controller, at different points along the network bus. While the remote devices 18 may be directly connected to the network bus 12, the remote devices of one advantageous embodiment are associated with respective network device interface elements 22. The network bus supports communications between the network controller and the remote devices, as well as communications between the remote devices themselves. The network of FIG. 6 operates essentially the same as the network of FIG. 5 as far as communications between the bus controller and the network devices.

Referring now to FIG. 7, each of the remote devices 18 connected to the network can receive input current from the pair of power lines 50 of the network bus 12. According to one embodiment of the system of the present invention, a sensing element 52 is connected along one of the power lines, preferably the negative power line, between the network bus and the respective remote device. The sensing element is capable of sensing the input current provided by the pair of power lines to the respective remote device. Whereas the sensing element can be any of a number of different devices for sensing the input current to the respective remote device, in a preferred embodiment the sensing element is a shunt, low-resistance resistor used to sense a voltage associated with the input current.

In a preferred embodiment, each sensing element 52 is electrically connected to and, in some embodiments, is incorporated within the network device interface element 22 associated with the respective remote device 18. In this regard, the network device interface element can transmit a signal indicative of the input current to the network controller 14. In the embodiment in which the sensing element is connected to the network device interface element, the sensing element is preferably connected to the network device interface element through an analog-to-digital converter 54 so that the signal transmitted by the network device interface element can be in a digital format for reception by the network controller. Whereas the illustration of FIG. 7 depicts only a single sensing element, it should be understood that each of the remote devices connected to the network preferably includes a respective sensing element.

To controllably alter the input current to the respective remote device 18, a switch 56 is connected along the other power line of the pair of power lines 50, preferably the positive power line, between the network bus 12 and the respective remote device. The switch can comprise any of a number of different devices but, in a preferred embodiment, the switch comprises a field effect transistor (FET). The switch is controlled by the network controller 14 and acts to controllably alter the input currents to the respective remote devices, typically operating in either an on mode wherein the switch permits the respective remote device to receive the input current, or an off mode wherein the switch prevents the respective remote device from receiving the input current. In this regard, FETs provide a very low impedance when in the on mode to thereby permit the respective remote device to receive input current, and a very high impedance when in the off mode to thereby prevent the respective remote device to receive input current.

Like each sensing element 52, in a preferred embodiment each switch 56 is electrically connected to, or is incorporated within, the network device interface element 16 associated with the respective remote device 18. In this regard, the network controller 14 can control the network device interface element to thereby control the switch to alter input current of the respective remote device. Preferably the network device interface element controls the switch through a digital output of the network device interface element so that the network controller can thereby digitally control the switch. In this regard, a switch comprising a FET typically operates in one of two extreme operating regions: cutoff or saturation, as such are known. When the network device interface element controls the FET in the off mode through the digital output, the FET operates in the cutoff region. And when the network device interface element controls the FET in the on mode through the digital output, the FET operates in the saturation region. Also like the sensing element, the illustration of FIG. 7 depicts only a single switch, but it should be understood that each of the remote devices connected to the network preferably includes a respective switch. Additionally, each line of the pair of power lines to each remote device could include a respective switch, if so desired, without departing from the spirit and scope of the present invention.

Referring to FIG. 8, in operation, the switches 56 to the plurality of remote devices 18 are first operated to allow the remote devices to receive the respective input currents, such as by placing the switches in the on mode upon initialization of the network (block 58). Whereas the flow chart of FIG. 8 references only a single remote device, it should be understood that FIG. 8 is for illustrative purposes only. In this regard, the same method would be applied to control the input current to each of the plurality of remote devices.

After placing the switches 56 in the on mode, the input current to the plurality of remote devices 18 is then controlled by continuously sensing the input current to monitor for excessive current situations in each remote device (block 60). The input current to each respective remote device is sensed by the sensing element 52 associated with the respective remote device. Preferably, the network device interface element 16 receives a measure of the input current from the sensing element. In this regard, the network device interface element can alternatively, or additionally, receive a voltage representative of the input current and generated by passing the input current across the sensing element, particularly when the sensing element comprises a shunt resistor. Moreover, the measure of the input current is preferably converted to a digital value either prior to reception by the network device interface element or within the network device interface element.

After the sensing element 52 has sensed input current to the respective remote device, the network device interface element 16 transmits, via the network bus 12, a signal to the network controller 14, which receives the signal (blocks 62 and 64). The signal is indicative of the input current and, in a preferred embodiment, is transmitted digitally via the network bus to the network controller. If the sensing element is a shunt resistor and the signal represents a voltage associated with the input current, the network controller determines the input current from the voltage and the resistance of the shunt resistor, as such is known. Alternatively, the network device interface element can determine the input current using the voltage and resistance of the shunt resistor and thereafter transmit the signal to the network controller.

After the network controller 14 has received the signal, or alternatively after the network controller has determined the input current from the signal, the network controller controls the respective switch 56, typically in the on or off mode. To control the respective switch, the network controller first determines a current control for the respective switch based upon the input current and an input current rating of the respective remote device 18, such as the current tolerance rating of the respective remote device. Because electrical devices can operate with currents above the respective current tolerance rating for a specified time period before overheating and/or catching fire, such as in the case of an initial inrush of current, the network controller can allow the respective remote device to operate above the current rating of the respective remote device for a predefined time period. In this regard, the current control system of the present invention overcomes one drawback of conventional circuit breakers and fuses.

The network controller 14 typically determines the current control by first comparing the input current against the input current rating for the respective remote device 18. To allow the remote device to operate with an input current above the respective current rating for a predefined period of time, the network controller typically utilizes a characteristic trip chart or curve for the respective remote device. The characteristic trip chart typically defines current levels above the current rating at which the respective remote device can operate for predefined periods of time, i.e., second predefined periods of time, before overheating and/or catching fire. The characteristic trip chart is typically stored by the network controller and/or the respective network device element and/or associated memory devices. In this regard, the current protection afforded to the remote devices can be adjusted by changing the characteristic trip chart stored by the network controller, as opposed to changing an entire mechanical circuit breaker or fuse. In addition to the characteristic trip chart, the network controller can also utilize, and accordingly store, an additional warning chart or curve defining current levels above the current rating at which respective remote device to operate for predefined periods of time, i.e., first predefined periods of time, before transmitting, such as to a user interface, a warning that the respective remote device is operating in a danger are&. For a respective remote device, the first predefined periods of time are less than the second predefined periods of time for each level of current such that the warning will afford an opportunity to remedy any problem while the remote device remains online before the current exceeds the current rating of the remote device for the second, i.e., longer period of time.

In addition to the characteristic trip chart and/or the warning chart, or in the alternative, the network controller can utilize algorithms for the same purpose as the charts. FIG. 9 illustrates the characteristic trip algorithm, or trip curve 92, and the warning algorithm, or warning curve 88, along with the input current 80 for a respective remote device 18 with a five amp input current rating. During normal operation, the remote device operates in a safe area 74 with an input current at or below the input current rating of the remote device. As the remote device operates in the safe area, the current control reflects the normal operation of the respective remote device, and the network controller 14 transmits a return signal, via the network bus, to the network device interface element to thereby operate the respective switch in the on mode.

If the input current exceeds the input current rating for the respective remote device 18 (point 82) and enters a monitor area 76, the network controller 14 begins to monitor the period of time that the input current has exceeded the input current rating of the respective remote device. If the remote device continues to operate with an input current above the input current rating for more than the first predefined period of time, illustrated as the point the input current crosses the warning curve (point 90), the network controller transmits the warning signal, such as to the user interface (see FIG. 8, blocks 66 and 68). If the remote device thereafter continues to operate with an input current above the input current rating for more than the second predefined period of time, illustrated as point the input current reaches the trip curve, the network controller determines that the respective switch should be opened to protect the respective remote device (block 70).

The network-controller then transmits the return signal, via the network bus, to the network device interface element to thereby place the respective switch in the off mode (block 72). As the network controller has placed the respective switch in the off mode, the respective remote device is shut down and therefore ceases to receive input current from the pair of power lines. In this regard, the respective remote device is protected from overheating and/or fire damage. To notify a user that the respective remote device has been shut down, the network controller can transmit a shut-down signal, such as to the user interface. After the respective remote device has been shut down, it remains without input current until such time as the network controller places the respective switch in the on mode, as desired. For example, the network controller could place the respective switch in the on mode following a system power cycle (e.g., system shutdown and subsequent initialization) and/or following a command from the user to the network controller, such as via the user interface.

The system and method of the present invention therefore protect the remote devices from excessive current that may damage the remote devices. The system and method of the present invention overcomes the drawbacks of conventional circuit breakers and fuses by providing excessive current protection individualized for specific remote devices, as opposed to protecting the network bus and all of the remote devices as a whole. Also, by utilizing a network controller to control the input current to the remote devices, the present invention can adjust current protection afforded to the remote devices without changing an entire circuit breaker or fuse, thus overcoming the material limitations of conventional circuit breakers and fuses.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for reestablishing stability of a network comprising:
   first and second bus controllers disposed in electrical communication with the network bus at opposite ends thereof such that the network bus extends therebetween, at least one bus controller adapted to detect a bus failure due to an open circuit condition; and
   a plurality of network devices also disposed in electrical communication with the network bus between said first and second bus controllers such that the first and second bus controllers are each configured to communicate with the plurality of network devices across the network bus; and
   at least one termination device associated with respective network devices, each termination device comprising a network termination element adapted to be switchably connected to the network bus,
   wherein the first bus controller is adapted to identify a bus failure due to an open circuit condition downstream of any respective one of the plurality of network devices relative to the first bus controller that divides the network bus into first and second portions with which the first and second bus controllers, respectively, are in electrical communication, wherein the first bus controller is also configured to issue a command instructing the termination device associated with the respective one of the plurality of the network devices upstream of the open circuit condition to switchably connect the network termination element to the network bus once the bus failure due to the open circuit condition has been identified such that communication between the first bus controller, the respective network device and any other network devices positioned on the first portion of the network bus between the first bus controller and the respective network device continues to be supported and further such that communication between the second bus controller and other network devices positioned on the second portion of the network bus continues to be separately supported.

2. A system according to claim 1 wherein each termination device further comprises a switch in-line with the network bus, and wherein each bus controller is further adapted to issue a command instructing the termination device associated with the respective network device to also open the switch in-line with the network bus to eliminate a network bus stub extending beyond the respective network device once a bus failure due to an open circuit condition has been identified downstream of said network device relative to said respective bus controller.

3. A system according to claim 2 wherein each termination device comprises the network termination element and a pair of switches in-line with the network bus on opposite sides of the network termination element, and wherein the command issued by each bus controller instructing the termination device associated with the respective network device to open the switch that is in-line with the network bus causes the switch that is positioned downstream of the network termination element relative to said respective bus controller to be opened.

4. A system according to claim 1 wherein the bus failure due to the open circuit condition occurs at a location along the network bus that separates the network bus into first and second portions, wherein said first and second bus controllers are disposed in electrical communication with the first and second portions of the network bus, respectively, and wherein each bus controller is further adapted to inventory said network devices that are disposed in electrical communication with the respective portion of the network bus and to identify said network device that is located closest to the location along the network bus of the open circuit condition.

5. A system according to claim 4 wherein the command issued by each bus controller instructs the termination device associated with said network device that is located closest to the location of the open circuit condition to switchably connect the network termination element to the network bus.

6. A system according to claim 1 wherein the network termination element comprises a resistor having a resistance that matches a characteristic impedance of the network bus.

7. A system according to claim 6 wherein the network bus comprises a pair of conductors, and wherein the termination devices associated with said network devices are adapted to switchably connect the resistor across the pair of conductors.

8. A system for reestablishing stability of a network comprising:
a bus controller disposed in electrical communication with the network bus, said bus controller adapted to detect a bus failure due to an open circuit;
a plurality of network devices also disposed in electrical communication with the network bus and said bus controller condition such that the bus controller is configured to communicate with the plurality of network devices across the network bus; and
at least one termination device associated with respective network devices, each termination device comprising a network termination element adapted to be switchably connected to the network bus in response to a command issued by said bus controller once said bus controller has detected a bus failure due to an open circuit condition downstream of said respective network device relative to said bus controller that divides the network bus into first and second portions with said bus controller only remaining in electrical communication with the first portion such that communication between the bus controller, the respective network device and any other network devices positioned on the first portion of the network bus between the bus controller and the respective network device continues to be supported even though the bus controller is no longer capable of communicating via the network bus with the second portion of the network bus.

9. A system according to claim 8 wherein each termination device further comprise a switch in-line with the network bus, and wherein said bus controller is further adapted to issue a command instructing the termination device associated with the respective network device to also open the switch that is in-line with the network bus to eliminate a network bus stub extending beyond the respective network device once a bus failure due to an open circuit condition has been identified downstream of said network device relative to said bus controller.

10. A system according to claim 8 wherein the bus failure due to the open circuit condition occurs at a location along the network bus, and wherein said bus controller is further adapted to inventory said network devices that remain in electrical communication therewith and to identify said network device that is located closest to the location of the open circuit condition.

11. A system according to claim 10 wherein the command issued by said bus controller instructs the termination device associated with said network device that is located closest to the location of the open circuit condition to switchably connect the network termination element to the network bus.

12. A system according to claim 8 wherein the network termination element comprises a resistor having a resistance that matches a characteristic impedance of the network bus.

13. A system according to claim 12 wherein the network bus comprises a pair of conductors, and wherein the termination devices associated with said network devices are adapted to switchably connect the resistor across the pair of conductors.

14. A method for reestablishing stability of a network comprising: supporting communications between a bus controller and a plurality of network devices across a network bus;
detecting a bus failure due to an open circuit condition at a location along the network bus which is downstream of any respective one of the plurality of network devices and which separates the network bus into first and second portions with said bus controller only remaining in electrical communication with the first portion;
identifying at least one network device disposed in electrical communication with the first portion of the network bus; and
issuing a command over the first portion of the network bus to instruct a termination device associated with the respective one of the plurality of network devices that were identified to be in electrical communication with the first portion of the network bus and upstream of the open circuit condition to connect a network termination element to the network bus to thereby reestablish the stability of the first portion of the network bus such that communication between the bus controller and the network devices that were identified to be in electrical communication with the first portion of the network bus continues to be supported even though the bus controller is no longer capable of communicating via the network bus with the second portion of the network bus.

15. A method according to claim 14 further comprising issuing another command over the first portion of the network bus to further instruct the termination device that has connected the network termination element to the network bus to disconnect any portion of the network bus that extends toward the location of the open circuit condition.

16. A method according to claim 14 wherein identifying the at least one network device comprises inventorying the network devices that are disposed in electrical communication with the first portion of the network bus and identifying the network device that is disposed in electrical communication with the first portion of the network bus that is located closest to the location of the open circuit condition.

17. A method according to claim 16 wherein issuing the command comprises issuing a command over the first portion of the network bus to instruct the termination device associated with the network device that is located closest to the location of the open circuit condition to connect the network termination element to the network bus.

18. A method according to claim 16 wherein identifying the at least one network device comprises inventorying the network devices that are disposed in electrical communication with the second portion of the network bus and identifying the network device that is disposed in electrical communication with the second portion of the network bus that is located closest to the location of the open circuit condition, and wherein issuing the command comprises issuing commands over the first and second portions of the network bus to instruct the termination devices associated with the respective network devices that are located closest to the location of the open circuit condition to connect network termination elements to the network bus.

19. A system for controlling input current to a plurality of remote devices comprising:
  a network comprising:
    a network bus electrically connected to the plurality of remote devices; and
    a network controller for directing communications with the plurality of remote devices via said network bus;
  a plurality of sensing elements electrically connected between said network bus and respective remote devices, wherein each sensing element is capable of sensing the input current to the respective remote device such that a measure of the input current can be provided to said network controller; and
  a plurality of switches electrically connected between said network bus and respective remote devices, wherein each switch is capable of controllably altering the input current to the respective remote device,
  wherein said network controller is configured to control each switch based upon the input current sensed by the respective sensing element and further based upon an input current rating of the respective remote device and a length of time that the input current has exceeded the input current rating.

20. A system according to claim 19, wherein said network controller is capable of controlling each switch such that the input current does not exceed the input current rating of the respective remote device for more than a second predefined period of time.

21. A system according to claim 20, wherein said network controller is further capable of transmitting a warning signal when the input current exceeds the input current rating of the respective remote device for more than a first predefined period of time, wherein the first predefined period of time is less than the second predefined period of time.

22. A system according to claim 19, wherein said network further comprises a plurality of network device interface elements electrically connected between said network bus and respective remote devices, wherein said plurality of sensing elements are electrically connected to respective network device interface elements, and wherein said network controller is capable of controlling each network device interface element to thereby control each switch of said plurality of switches.

23. A system according to claim 19, wherein said plurality of switches operate in an on mode wherein said plurality of switches permit respective remote devices to receive the input current, and in an off mode wherein said plurality of switches prevent the respective remote devices from receiving the input current, and wherein said network controller controls the mode of each switch depending upon the input current and the input current rating of the respective remote device.

24. A system according to claim 23, wherein said network controller is capable of operating a switch in the on mode when the input current does not exceed the input current rating of the respective remote device for more than a second predefined period of time, and wherein said network controller is capable of placing the switch in the off mode when the input current exceeds the input current rating of the respective remote device for more than the second predefined period of time.

25. A system according to claim 24, wherein said network controller is further capable of transmitting a warning signal when the input current exceeds the input current rating of the respective remote device for more than a first predefined period of time, wherein the first predefined period of time is less than the second predefined period of time.

26. A method of controlling input current to a plurality of remote devices comprising:
  sensing the input current to each respective remote device;
  transmitting a signal indicative of each respective input current, wherein said transmitting comprises transmitting the signals across a network bus electrically connected to the plurality of remote devices;
  receiving the signal at a network controller that is electrically connected to the plurality of remote devices via the network bus; and
  controlling the input current to each remote device, wherein said controlling comprises determining a current control based upon the input current and further based upon an input current rating of the respective remote device and a length of time that the input current has exceeded the input current rating, and thereafter transmitting a return signal from the network controller indicative of the current control to each respective remote device to thereby control the input current.

27. A method according to claim 26, wherein said controlling comprises controlling the input current to each respective remote device such that the input current does not exceed the input current rating of the respective remote device for more than a second predefined period of time.

28. A method according to claim 27 further comprising transmitting a warning signal from the network controller when the respective input current exceeds the input current rating of the respective remote device for more than a first predefined period of time, wherein the first predefined period of time is less than the second predefined period of time.

29. A method according to claim 26, wherein said controlling comprises controlling a mode of each of the plurality of remote devices, wherein an on mode that permits a respective remote device to receive the input current, and an off mode that prevents the respective remote device from receiving the input current.

30. A method according to claim 29, wherein said controlling comprises operating a remote device in the on mode when the input current does not exceed the input current rating of the respective remote device for more than a second predefined period of time, and placing the remote device in the off mode when the level of the input current exceeds the input current rating of the respective remote device for more than the second predefined period of time.

31. A method according to claim 30 further comprising transmitting a warning signal when the input current exceeds the input current rating of the respective remote device for more than a first predefined period of time, wherein the first predefined period of time is less than the second predefined period of time.

32. A system for digitally controlling input current to a plurality of remote devices comprising:
   a digital network comprising:
      a network bus electrically connected to the plurality of remote devices;
      a plurality of network device interface elements electrically connected between said network bus and the plurality of remote devices; and
      a network controller for digitally directing communications with the plurality of remote devices via said network bus and said plurality of network device interface elements;
   a plurality of sensing elements electrically connected to said plurality of network device interface elements, wherein each sensing element is capable of sensing the input current to the respective remote device such that said network device interface element can provide a measure of the input current to said network controller; and
   a plurality of switches electrically connected between said network bus and respective remote devices, wherein each switch is capable of controllably altering the input current to the respective remote devices
   wherein said plurality of network device interface elements are configured to control each switch, and wherein said network controller is capable of controlling each network device interface element to thereby control the respective switch based upon the input current sensed by the respective sensing element and further based upon an input current rating of the respective remote device and a length of time that the input current has exceeded the input current rating.

33. A system according to claim 32, wherein said network controller is capable of controlling each network device interface element to thereby control the respective switch such that the input current does not exceed the input current rating of the respective remote device for more than a second predefined period of time.

34. A system according to claim 33, wherein said network controller is further capable of transmitting a warning signal when the input current exceeds the input current rating of the respective remote device for more than a first predefined period of time, wherein the first predefined period of time is less than the second predefined period of time.

35. A system according to claim 32, wherein said plurality of switches operate in at least one mode selected from a group consisting of an on mode wherein said plurality of switches permit respective remote devices to receive the input current, and an off mode wherein said plurality of switches prevent the respective remote devices from receiving the input current, and wherein said network controller controls each network device interface element to thereby control the mode of the respective switch depending upon the input current and the input current rating of the respective remote device.

36. A system according to claim 35, wherein said network controller is capable of controlling each network device interface element to thereby operate the respective switch in the on mode when the input current does not exceed the input current rating of the respective remote device for more than a second predefined period of time, and wherein said network controller is capable of controlling each network device interface element to thereby place the respective switch in the off mode when the input current exceeds the input current rating of the respective remote device for more than the second predefined period of time.

37. A system according to claim 36, wherein said network controller is further capable of transmitting a warning signal when the input current exceeds the input current rating of the respective remote device for more than a first predefined period of time, wherein the first predefined period of time is less than the second predefined period of time.

* * * * *